J. SCOTT.
Traverse-Mechanisms for Ring Spinning Frames.
No. 158,530.
2 Sheets--Sheet 2.
Patented Jan. 5, 1875.
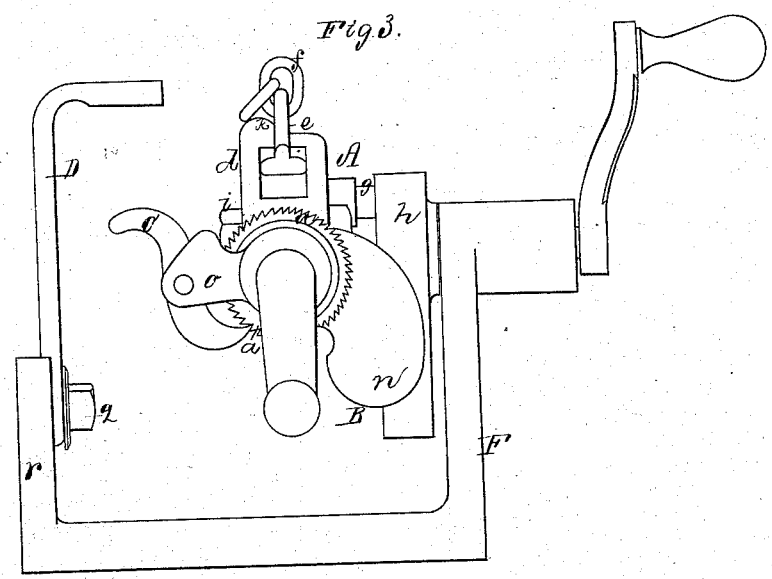
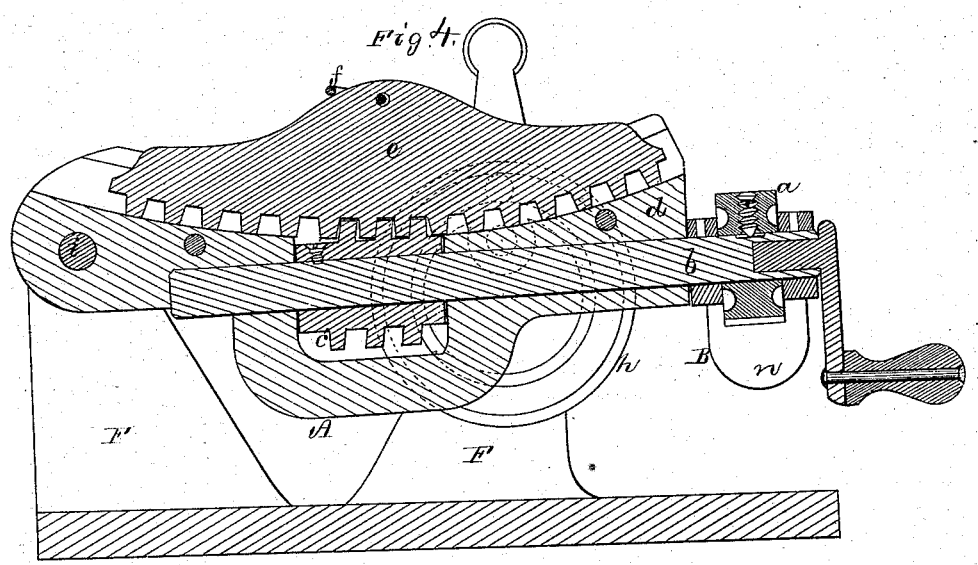
Witnesses.
S. W. Piper
L. W. Miller
John Scott.
by his attorney
N. W. Eddy.

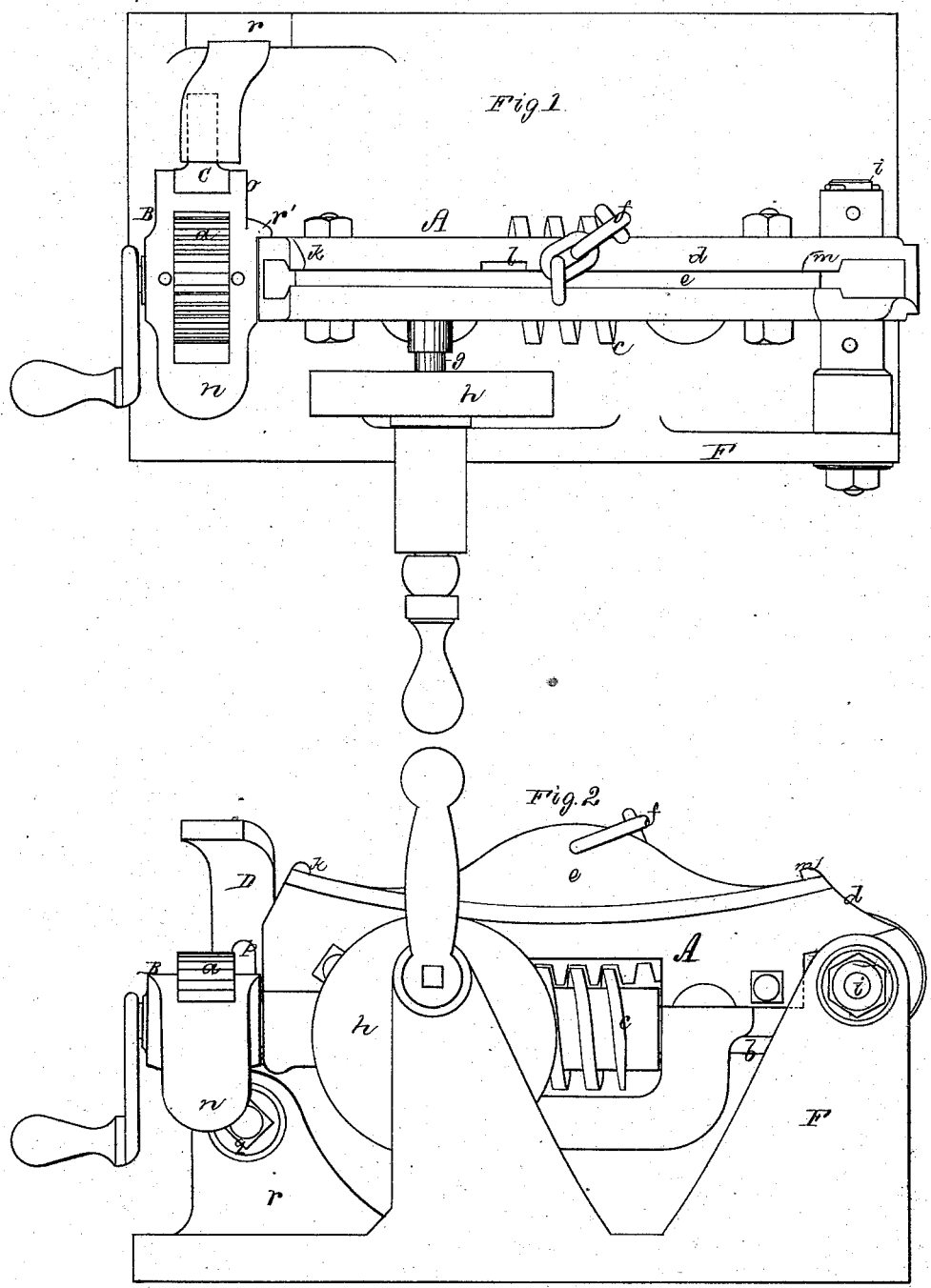

UNITED STATES PATENT OFFICE.

JOHN SCOTT, OF LOWELL, MASSACHUSETTS, ASSIGNOR TO LOWELL MACHINE SHOP, OF SAME PLACE.

IMPROVEMENT IN TRAVERSE MECHANISMS FOR RING SPINNING-FRAMES.

Specification forming part of Letters Patent No. 158,530, dated January 5, 1875; application filed December 9, 1874.

*To all whom it may concern:*

Be it known that I, JOHN SCOTT, of No. 9 Butterfield street, of the city of Lowell, of the State of Massachusetts, have invented a new and useful Improvement in the Traverse Mechanism of Ring Spinning-Frames; and do hereby declare the same to be fully described in the following specification and represented in the accompanying drawings, of which—

Figure 1 is a top view, Fig. 2 a side elevation, Fig. 3 an end view, and Fig. 4 a longitudinal section, of my improved machinery for effecting the traverse of the ring-rail of a spinning-frame.

The object of the invention is to enable the yarn-load of each bobbin to be formed with a greater or less taper near each of its ends, as may be desirable, and this without the necessity of removing from the "builder" the ratchet and substituting therefor another of a different diameter or construction, as has heretofore been the practice. The "yarn-load builder" or mechanism, generally employed in spinning-frames to effect the traverse of the ring-rail, is represented at A in the drawings as composed of the ratchet-wheel *a*, the shaft *b*, screw *c*, vibrating arm *d*, arched rack *e*, chain *f*, stud *g*, and cam *h*, arranged as shown. The shaft *b* is pivoted in the arm *d*, which, near one end, turns on a journal, *i*, projecting from the supporting-frame F. The arm is channeled lengthwise to receive the arched rack *e*, which is to slide longitudinally in the arm, and engage with the screw *c*, fixed on and to the shaft, the extent of longitudinal movement of the rack being determined by stops *k l m*, one of which projects from the rack and the others from the arm, all as shown. From the arm *d* the stud *g* extends, and enters the grooved cam *h*. Such cam, on being revolved, will impart to the radial arm *d* a reciprocating motion upon its journal. The chain *f* of the rack, when in use, is so connected with the ring-rail as to produce a vertical movement of it when the arm is in motion downward. The nearer the point of connection of the chain and rack is brought to the journal *i* the less will be the movement of the ring-rail during each movement of the arm. By revolving the screw the rack will be moved lengthwise in the arm.

In carrying out my invention I combine with the yarn-load builder A, as described, certain mechanism, as follows—that is to say, I pivot upon the shaft *b* a gravitating vibratory lever or pawl carrier, B, arranged with the ratchet-wheel *a*, and formed in the manner shown, such lever turning freely on the shaft, and having one arm, *n*, weighted sufficiently to overbalance and raise the other arm, *o*, and a lever-pawl, C, pivoted thereto. The carrier is furcated to receive the pawl, which is to act with the teeth of the ratchet-wheel, and to turn or vibrate freely in the carrier. Furthermore, with the said mechanism I use an adjustable abutment, D, formed and arranged to project over the outer arm of the pawl, in the manner represented. This adjustable abutment has a slot, *p*, made in its shank to receive a clamp-screw, *q*, which goes through the slot and screws into a stationary standard, *r*, projecting up from the builder and cam-supporting frame F. As the builder A has a positive vibratory motion imparted to it by the cam, it will be seen that every time such builder may be in the act of being raised the tail of the pawl will be carried into contact with the abutment so as to cause the pawl, as the builder may continue to move upward, to so act against the ratchet-wheel as to revolve it and the shaft, whereby the screw will be revolved in a manner to move the curved rack lengthwise. This latter movement will be such as to carry the chain nearer the journal of the arm of the builder, and thereby vary the traverse of the ring-rail.

There extends from the pawl-carrier a stop, *r'*, which, by bringing up against the arm, arrests the return movement of the carrier, caused by its gravitating arm. During a downward movement of the builder the gravitating arm of the pawl-carrier will turn such carrier on the shaft *b* so as to raise the pawl and slip it over the teeth of the ratchet, in order that, while the builder may next be put in movement upward, the tail of the pawl may be moved against the abutment, and the pawl be caused to turn the ratchet and thereby turn the shaft.

I make no claim to the yarn-load builder A, as described.

What I claim as my invention is—

The adjustable abutment D, the vibratory pawl C, and gravitating vibratory pawl-carrier B, provided with the stop $r'$, in combination with the yarn-load builder A, all being substantially and to operate as and for the purpose specified.

JOHN SCOTT.

Witnesses:
R. H. EDDY,
J. R. SNOW.